_United States Patent Office_

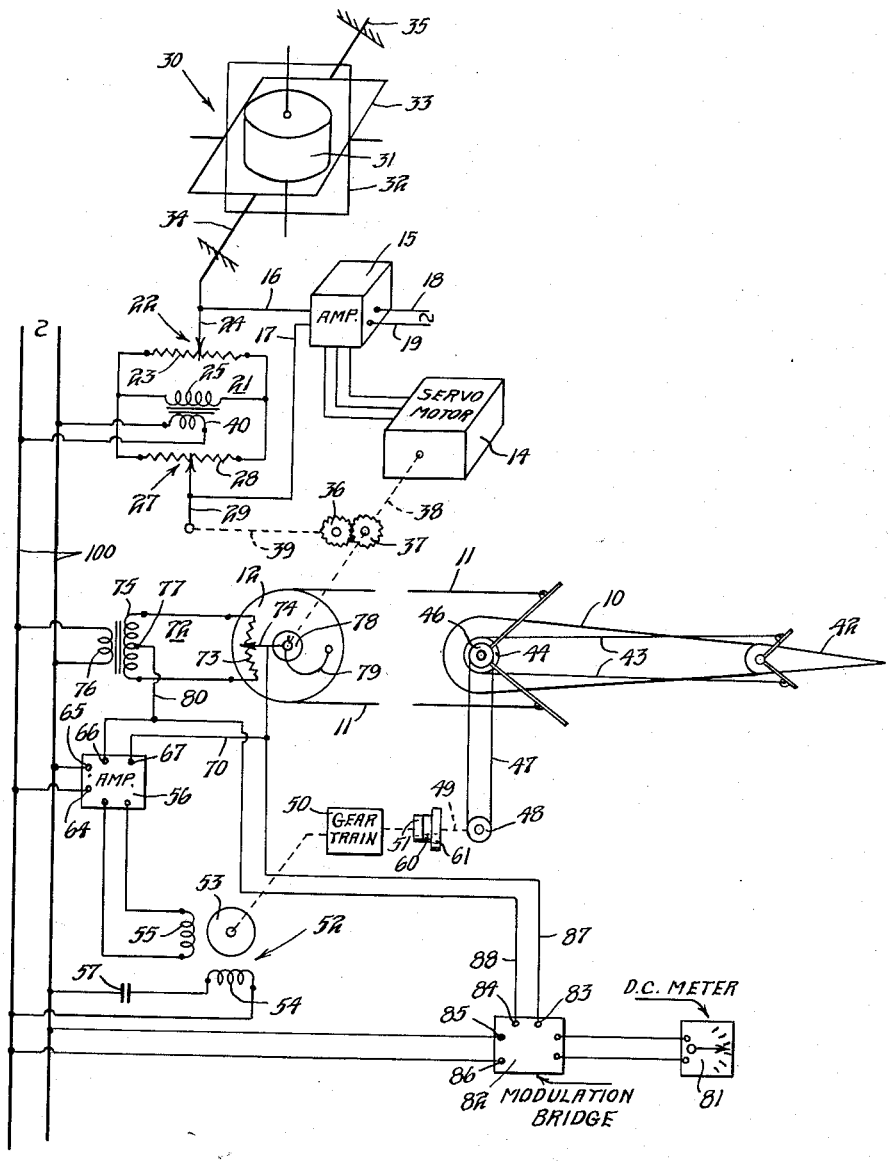

2,723,089
Patented Nov. 8, 1955

2,723,089

AIRCRAFT CONTROL AND INDICATING APPARATUS

Oscar Hugo Schuck and Ross C. Alderson, Minneapolis, Minn., assignor to Minneapolis-Honeywell Regulator Company, Minneapolis, Minn., a corporation of Delaware Application December 18, 1947, Serial No. 792,560

13 Claims. (Cl. 244—77)

This invention is concerned with apparatus that is provided in an aircraft which apparatus automatically stabilizes the aircraft with respect to an axis thereof by operation of a control surface. There exists apparatus for stabilizing an aircraft with respect to an axis thereof that operates in such manner that the existence of a steady-state condition which tends to change the attitude of the aircraft about said axis is countered by a steady-state displacement of a control surface of said aircraft. Where such control surface is steadily displaced, a continuing or steady force must be applied by the apparatus to resist the tendency of the force on the displaced control surface, due to the air stream, to return it to a position of zero aerodynamic force. Under these conditions, where the control surface must be steadily displaced, the aircraft is said to be in an out of trim condition.

An object of our invention concerns improved means for providing a compensating effect when steady-state out of trim conditions of said aircraft exist. By the means which we provide, the stabilizing apparatus is relieved of the burden of supplying a steady force or moment which is necessary to resist the force or moment of the air stream on the control surface.

A control surface of an aircraft is in many cases provided with an auxiliary control surface termed a trim tab. A further object of our invention is to provide for the positioning of a trim tab by improved control means, dependent upon the presence of an out of trim condition in said aircraft, whereby the required steady displacing moment on the control surface is developed by the moment produced by the trim tab. The stabilizing apparatus is thereby relieved of the task of counteracting the steady force or moment tending to streamline the displaced control surface.

A further object of our invention is to provide automatic means for positioning the control surface trim tab, dependent upon the steady-state control surface moment, acting in such a way as to reduce the steady-state moment to zero.

A further object of our invention is to provide improved means for positioning a trim tab of a control surface of an aircraft upon the existence of a steady-state reactive moment of the air stream on the control surface and to indicate when the reactive moment is adequately counteracted by the opposing moment developed by the trim tab as positioned.

A further object of our invention is to provide an indication in accordance with the magnitude and direction of the force or moment due to the out of trim condition.

A further object of our invention is to provide an indication in accordance with the magnitude and direction of the reactive moment developed by the air stream on a control surface of an aircraft, which reactive moment is being counteracted by the control surface operating means, and manually operable means for positioning a trim tab associated with the control surface so that the position of the trim tab may counterbalance said reactive moment thereby to reduce said indication.

These and other objects of the invention will be perceived upon consideration of the accompanying description and drawing of a preferred embodiment of our invention.

The sole figure comprising the drawings is a diagram of our invention applied to an aircraft having an elevator for controlling the position of the aircraft about the pitch axis.

Referring to the figure, the aircraft is controlled about the pitch axis by a main control surface or elevator 10. The elevator is operated by cables 11 extending from the cable drum 12. In the figure the cables are discontinuously illustrated by a break in the cable. The cable drum 12 is operatively driven by an elevator servo motor 14 which in turn is controlled by the elevator servo motor amplifier 15. The amplifier and servomotor arrangement is such that the direction of rotation of motor 14 depends on the voltage applied to amplifier 15 and may be similar to that disclosed in Patent 2,425,734 dated August 19, 1947. Amplifier 15 is provided with signal input terminals connected to leads 16 and 17 and power input terminals connected to leads 18 and 19 which are further connected to a source of voltage such as the inverter (not shown) of the aircraft through a supply line 100. The direction of rotation of the servomotor 14 depends upon the phase relationship between the voltage across leads 16 and 17 and that across leads 18 and 19.

The signal input circuit of amplifier 15 extends from lead 16, pitch deviation-servo balance network 21, lead 17, to amplifier 15. The pitch deviation-servo balance network 21 comprises a pitch deviation potentiometer 22 and a servo balance potentiometer 27. Potentiometer 22 has a resistor 23 which is connected across the ends of the secondary winding 25 of a transformer having a primary winding 40. The potentiometer 27 has a resistor 28 connected across the ends of secondary winding 25 in parallel with resistor 23. Potentiometer 22 is provided with a contactor 24 which is adjustable over the surface of resistor 23. Potentiometer 27 is provided with a contactor 29 which is adjustable over the resistor 28. It may be seen that the network 21 is in the form of a Wheatstone bridge with the wipers 24 and 29 representing the output member for the bridge. The wiper 24 is connected through lead 16 to amplifier 15. Wiper 29 is connected by means of lead 17 to amplifier 15. The wiper 24 is adjusted by a vertical gyro 30.

The vertical gyro 30 may be of the conventional three degrees of freedom type in which the rotor 31 is mounted for rotation about an axis which is perpendicular to the earth. The rotor 31 is carried by an inner gimbal ring 32. The inner gimbal ring 32 is trunnioned in an outer gimbal ring 33 about an axis that is at right angles to the axis of the rotor 31. The outer gimbal ring in turn has trunnions 34 and 35 which are supported by bearings carried by the craft. The axis of trunnion 34, 35 is perpendicular to the axis of rotation of the inner gimbal ring 32.

The wiper 24 is secured to the trunnion 34 and operated thereby upon movement of the aircraft about its pitch axis. The wiper 29 of the servo balance potentiometer 27 is driven through a follow up connection from servomotor 14 by any suitable means such as intermeshing gears 36, 37 carried by the servomotor shaft 38 and the operating shaft 39 for wiper 29.

An auxiliary control surface or trim tab 42 is pivotally carried near the trailing edge of the elevator 10. The trim tab 42 is operatively connected to cables 43 which for a simplified illustration are shown to extend from a sheave 44. Adjacent to the sheave 44 and relatively fixed thereto is an additional sheave 46. The sheaves 44 and 46 are rotatably carried by the pivotal axis of the elevator 10. Extending from the sheave 46 is an additional operating cable 47 which engages a single pulley 48 carried by shaft 49. While the arrangement shown is sufficient for understanding this invention, in practice the operating means for the trim tab 42 includes provisions, such as a differential, between the elevator actuator and the trim tab actuator so that the position of the trim tab relative to the elevator will not be affected by movement of the elevator. The pulley 48 and its shaft 49 are operatively driven by a trim tab operating motor 52 through a reduction gearing 50 and an overriding clutch or friction clutch 51 which is intermediate the pulley 48 and reduction gear 50. The clutch includes a driving member 51 and a driven member 60. Associated with the driven member is a manually operable controller 61 which may be operated to adjust trim tab 42 and to disengage the driven member from the driving member. Such overriding clutch may comprise a driving member, a driven member, with rollers between said members which on initial movement of the drive member are displaced to effect the engaged relationship of the members. The driven member is provided with means to disengage the two members and to allow manual rotation of the driven member. Such clutch may be of the type disclosed in the patent to Kastner, 1,028,360.

The trim tab operating motor 52 may be and is illustrated as a capacitor type induction motor having a squirrel cage rotor 53 which coacts with two phase windings 54, 55. The winding 54 is connected in series with a capacitor 57 across the line 100 and the winding 55 is connected to the output terminals of an amplifier 56. The amplifier 56 is provided with signal input terminals 66 and 67 and power input terminals 64 and 65 the latter two being connected to the line 100. The direction of rotation of the trim tab motor 52, as well known, depends upon the phase relationship between the voltage across signal input terminals 66 and 67 of amplifier 56 and that across line-excited winding 54 of motor 52.

The signal input circuit to amplifier 56 extends from terminal 67, lead 70, elevator hinge-moment sensing network 72, lead 80, to terminal 66 of amplifier 56. The hinge-moment sensing network 72 includes a resistor 73 which is suitably connected across the ends of a secondary winding 75 of a transformer having a primary winding 76 which is connected to the line 100.

Resistor 73 is carried in insulated relation by the elevator cable drum 12. A contactor 74 is operative over the surface of resistor 73 and is carried by a hub 78 mounted on the servomotor shaft 38. Interposed between the hub 78 and the drum 12 is a resilient member or spring 79 which is secured at one end to the drum 12 and at the other end to the hub 78. The spring 79 serves to bias the wiper 74 toward the electrical center of resistor 73 and further serves as a torque transmitting means between the hub 78 and the drum 12. Lead 70 extends from terminal 67 to the wiper 74. The secondary winding 75 has a center tap 77 which is connected by means of lead 80 to terminal 66 of amplifier 56.

Operated in parallel to the amplifier 56 which controls the trim tab motor 52 is a hinge-moment indicating arrangement. This hinge-moment indicating arrangement comprises a D. C. meter 81 operated from a modulation bridge 82. The D. C. meter 81 may be of any suitable type whose pointer may be deflected to one side or the other from a zero position depending upon the polarity of the signal applied to its input terminals. The meter 81 is connected across the output terminals of the modulation bridge 82. The modulation bridge may be of the type disclosed on page 567 of AC Bridge Methods by B. Hague, 1943 edition. Such bridge has signal input terminals 83 and 84 and terminals 85, 86, the latter two being connected to the line 100. By means of the bridge the two A. C. inputs are converted into a D. C. output whose phase depends upon the phase across terminals 83 and 84 of bridge 82. The signal input terminals 83 and 84 of the modulation bridge 82 are connected by means of leads 87 and 88 to the wiper 74 and center tap 77 of the hinge-moment sensing network 72.

*Operation*

Operation of the apparatus will be considered with respect to a normal position or condition. When the aircraft is flying in a level position, wiper 24 of pitch deviation potentiometer 22 and wiper 29 of servo balance potentiometer 27 are at the electrical centers of their respective resistors 23, 28. At this time both wipers are at the same potential and there is no signal applied to the input terminals of amplifier 15. Similarly, wiper 74 of hinge-moment sensing network 72 is at the electrical center of resistor 73 and is consequently at the same potential as center tap 77 of secondary winding 75. Consequently, there is no input signal applied to amplifier 56. The elevator control surface 10 and its trim tab 42 are in normal or horizontal position.

If the aircraft is tilted about the pitch axis due to a transient condition the vertical gyro moves wiper 24 from its center position to apply a signal to amplifier 15 and servomotor 14 which operate wiper 29 to balance the amplifier input circuit and position the elevator. As the elevator restores the craft toward normal, the gyro moves wiper 24 toward center thereby causing an unbalance in the amplifier input circuit to cause reverse movement of the servomotor which moves wiper 29 to rebalance the input circuit and the elevator to normal position.

In the following operation to be described, on the other hand, it is assumed that a steady-state out of trim condition exists. This steady-state out of trim condition may result from the change in the position of the center of gravity of the aircraft as a whole. For example, if part of the weight carried by the craft is moved toward the after part of the cabin the front or nose of the aircraft will tilt upwardly. As the craft tilts upwardly the wiper 24 is stabilized by the vertical gyro 30 and maintains its position in space consequently the wiper 24 will apparently move toward the right end of resistor 23. The wiper 24 will now be at a different potential than wiper 29. Assuming the voltage between wiper 24 and wiper 29 to be in phase at this time with the voltage between leads 18 and 19 supplied from the line 100 the amplifier 15 will operate. Operation of amplifier 15 at this time will cause the elevator servomotor 14 to rotate in a clockwise direction whereby the elevator control surface 10 is lowered or moved in a clockwise direction. Servomotor 14 also through the follow up connection positions wiper 29 towards the right until network 21 is in balanced condition at which time the amplifier ceases to operate.

Under the applied down elevator the aircraft tends to move from its upwardly inclined direction toward the horizontal. This movement of the aircraft toward the horizontal causes the vertical gyro 30 to apparently move wiper 24 toward the left from its right position. At this time wiper 24 is again at a different potential from wiper 29. Since the wiper 24 is toward the left from wiper 29 the signal between wipers 24 and 29 is considered out of phase from the original signal derived from network 21. In response to this out of phase signal, amplifier 15 causes servomotor 14 to drive cable drum 12 in a counter clockwise direction. Servomotor 14 also operates through the follow up connection to position wiper 29 toward the left until the network is again balanced. It is evident therefore that as the contactor 24 is moved toward the center from its rightward position that the amount of down elevator is decreased. It is further evident that elevator 10 cannot assume its normal position, otherwise the craft would immediately nose upward due to the shift on the center of gravity. Consequently, a point is reached where the contactor 24 assumes a position to the right from its normal position. Follow up wiper 29 is also positioned toward the right from its normal position so that the amplifier input is balanced.

Since the elevator 10 is in a slightly down position there is a constant force by the air stream tending to move the elevator 10 back to its normal position. In the type of servomotor disclosed in the aforementioned patent, the servomotor shaft is held in locked position when it is not operating; consequently, hub 78 will be locked against movement. Force of the air stream on the elevator 10 is communicated through the operating cables 11 to the cable drum 12. A torque or moment is applied to the cable drum 12 tending to rotate it. The resilient connection or spring 79 between drum 12 and hub 78 permits the force on the elevator 10 to relatively rotate cable drum 12 with respect to hub 78. Resistor 73 carried by drum 12 will have its electrical center moved with respect to contactor 74 carried by hub 78. The potential of contactor 74 will not be the same as center tap 77, consequently a voltage signal will be applied to the input terminals 66 and 67 of the trim tab motor amplifier 56. The phase of the voltage between contactor 74 and center tap 77, and therefore between terminals 66 and 67, with respect to the voltage across motor winding 54 is such as to cause the trim tab motor 52 to rotate in such a direction that its movement as applied through the reduction gearing 50, clutch 51, pulley 48, cables 47, sheave 46, sheave 44, and cables 43, will position the trim tab 42 in an upward direction.

The force of the air stream on the trim tab 42 tends to rotate the elevator 10 in a clockwise direction whereas the force of the air stream on the main control surface 10 tends to rotate the elevator in a counterclockwise direction. As the clockwise moment on the trim tab 42 increases, it decreases the torque applied to the cable drum 12. The resilient connection 79 therefore causes drum 12 to rotate in a clockwise direction tending to bring the center tap of resistor 73 in alignment with contactor 74.

As long as the center tap of resistor 73 and contactor 74 are out of alignment, contactor 74 and the center tap 77 are at a different potential, consequently the trim tab motor amplifier 56 is operated. The trim tab motor 52 is continuously operated by the amplifier 56 until the trim tab surface 42 has assumed a position such that the moment on its surface is equal and opposite to the moment on the main control surface 10, at which time the center tap of resistor 73 has been moved into alignment with contactor 74. At this time there is no difference of potential between contactor 74 and the center tap 77 and no input signal is provided to the amplifier 56. The amplifier 56 ceases to operate the motor 52.

With the moment on the trim tab equal to that on the main elevator 10, but of opposite direction, there is no differential tension in the operating cables 11 to the elevator 10, consequently, the center tap of resistor 73 will remain in alignment with contactor 74.

The aircraft flies with its main control elevator in a slightly depressed position and with the wipers 24 of the deviation potentiometer and the wiper 29 of the servo balance potentiometer to the right of the normal position. Since the forces on the upper and lower elevator operating cables are now equalized, there is no force on the drum 12 and the motor shaft 38 tending to rotate the same, consequently, the servomotor 14 is relieved from the load which had been applied to it previous to the positioning of the trim tab 42.

During the time that the hinge-moment sensing network 72 has been applying a signal to the trim tab motor amplifier 56 it has also supplied a signal to the modulation bridge 82. The D. C. meter 81 has been operated by the output from the modulation bridge to indicate the magnitude and direction of the force of the air stream on the main control surface. As the moment applied by servo motor 14 to the main control surface 10 is removed, due to the development of a moment by the trim tab 42, the signal from the network 72 decreases and the indication on the meter 81 decreases. The meter 81 will be at the zero position when the center of resistor 73 is in alignment with contactor 74 at which time the required steady-state moment of the control surface is being entirely developed by the aerodynamic action of the trim tab. The meter 81 may therefore serve as an indication as to the relative distance which the trim tab must be positioned until the moment required of the main control surface 10 is entirely developed by the trim tab 42.

The operation has been described where a steady-state out of trim position exists due to a change in position of the center of gravity toward the tail of the aircraft. The apparatus operates in an opposite manner to provide up elevator when the center of gravity has been shifted toward the nose of the aircraft. This movement forward of the center of gravity is accompanied by an opposite unbalance of the network 21 which is accompanied also by a downward positioning of the trim tab 42 whereby the moment on the trim tab 42 tending to rotate the control surface 10 in a counter clockwise direction balances the moment on the control surface 10 tending to rotate it in a clockwise direction. The indicating meter 81 will have moved from its center position in an opposite direction to indicate the maximum moment on the main control surface and will be restored to its center position as the moment developed by the trim tab becomes that required to develop the moment required to keep the main control surface in the position necessary to maintain the selected attitude.

It would appear that whenever the control surface 10 is displaced that there is a force on this surface which tends to move the drum 12 with respect to the hub 78. Thus it would appear that the trim tab motor 52 is operated to position the trim tab 42 even though the apparatus is functioning to correct for a deviation in pitch due to a transient condition as distinguished from a steady-state condition due to shifting of the center of gravity of the aircraft or other variation in flight condition. It will be recalled, however, that the trim tab motor drives the trim tab 42 through a reduction gear 50 so that the trim tab 42 is positioned at a very slow rate. For short-time transient effects such as those resulting from the tilting of the aircraft, due to a disturbance in the air, the trim tab 42 is moved only a small amount. Further, it is considered that there are as many disturbances tending to move the nose of the aircraft upwardly as there are tending to move it downwardly; consequently any small motions of the trim tab 42 in one direction would be equalized by small motions in the other direction. The trim tab therefore remains substantially in its steady-state position since the transient conditions over a period of time balance out.

While the contactor 74 has been illustrated as controlling the motor through a potentiometer and amplifier, it is evident that it may coact with spaced contacts which may replace the resistor 73 to control the motor 52, and that any other device suitable for measuring the control surface hinge-moment and producing an electrical output dependent thereon may be used for controlling the trim tab actuating motor as described above. Likewise, the motor may be of any type suitable for the service required. Furthermore, the inclusion of a tachometer generator, to permit velocity feedback for greater control system stability, is an obvious extension of the procedures described above.

It is now evident that we have provided a novel trim tab positioning and indicating apparatus in which the positioning of the trim tab relieves the servomotor that operates the main control surface from required load and the indicator indicates continuously the magnitude of the load.

While we have disclosed our invention in one form of apparatus, we do not wish to limit our invention to the details of the embodiment illustrated. We therefore would limit our invention only by the statements in the appended claims.

We claim as our invention:

1. Control apparatus for an aircraft comprising: operating means; transmission means driven by said operating means adapted to move a main control surface and responsive to a force applied to said control surface; a motor adapted to operate an auxiliary control surface; electrically operated indicating means displaceable in either direction from a normal position; variable electric signal producing means having an output that may be varied in phase or polarity and magnitude and actuated by said transmission means; means operated by said signal means for controlling said motor; and further means operated by said signal means for controlling said indicating means whereby the reactive force from said control surface to said transmission means may be observed.

2. Control apparatus for an aircraft having a first adjustable means for controlling its position about an axis comprising: actuating means for said adjustable means; control means for said actuating means comprising a balanceable electrical network including a control member and a controlled member; attitude means responsive to the movement of the aircraft about said axis; operative connections from said attitude means to said control member; operative connections from said actuating means to said controlled member; further adjustable means for controlling the aircraft about said axis; means responsive to an effect caused by a steady force tending to turn the aircraft about said axis as the result of the operation of said first adjustable means; indicating means controlled by said force responsive means and operated in proportion to the force; and additional means controlled by said force responsive means for operating said further adjustable means to modify the effect on said force responsive means.

3. Control apparatus for an aircraft comprising: a main control surface electric motor means; an auxiliary control surface actuating means; transmission means driven by said motor means, and adapted to be connected to said control surface, said transmission means including two rotationally relatively displaceable members biased toward a normal position; a second motor means including a friction clutch operative upon relative displacement of said members for controlling said actuating means; and manually operable means for overriding said friction clutch and operating said actuating means without altering the position of said second motor means.

4. Control apparatus for an aircraft having a main control surface, and an auxiliary control surface said control apparatus comprising: a first main control surface motor means; a second auxiliary control surface motor means; a main control surface transmission means operated by said first motor means, said transmission means including two relatively displaceable members biased toward a normal position but relatively displaced in proportion to the reactive force on said main surface; means operative upon said relative displacement for controlling said second motor means; and means including an indicator operative upon said relative displacement for providing an indication in proportion to the extent of said displacement whereby the reactive force on the transmission means may be observed.

5. Control apparatus for an aircraft having a main control surface and an auxiliary control surface said control apparatus comprising: a main control surface power means; an auxiliary control surface actuating means; a main power transmission means having means responsive to the reactive force applied to said transmission means from said main surface; operating means for said actuating means controlled by said responsive means, the operation of said auxiliary surface reducing the force on said transmission means; indicating means controlled by said responsive means whereby the force on said transmission means may be observed; and manually operable means for independently operating said actuating means.

6. Control apparatus for an aircraft having a main control surface and an auxiliary control surface said apparatus comprising: a first main control surface electric motor means, including a motion transmitting device having two relatively displaceable members; an alternating current pick-off device including two elements one element carried by one member and the other element being carried by the other member for providing a signal variable in phase and magnitude in accordance with the direction and magnitude of the relative displacement; an auxiliary control surface slow acting electric motor means, said auxiliary surface serving to reduce said displacement; indicating means operable in accordance with the magnitude and direction of a signal; and means for controlling said second motor means and said indicating means from said pick-off device whereby the effect of said auxiliary surface may be observed on said indicator.

7. Control apparatus for an aircraft having a main control surface and a trim tab carried by said surface said apparatus comprising: a first electrical motor means for operating said main control surface; a second electrical motor means for operating said trim tab; a first electrical signal providing pick-off means having two relatively displaceable elements; means for relatively displacing said elements; means responsive to said signal from said pick-off means for controlling said first motor means; a second electrical pick-off device having two relatively displaceable elements; means responsive to the torque applied to said first motor means for displacing said elements; and means controlled by continued displacement of the elements of said second pick-off for controlling said second motor means.

8. Control apparatus for an aircraft having a control surface with a trim tab, said apparatus comprising: a control surface electric motor means, said motor means including a transmission means having two biased connected relatively movable members; a variable impedance controlled by the relative movement of said members to provide a signal in proportion to the magnitude of the reactive force applied to said transmission means from said surface; an indicating means controlled by said variable impedance in proportion to the direction of and the magnitude of said force; and manually operable means for adjusting said trim tab, whereby the effect of reducing said force by positioning said tab may be observed on said indicator.

9. Control apparatus for an aircraft comprising: a first main control surface power means; a balanceable control means for said power means including a main controller and a follow up controller; attitude means responsive to change in its angular position about one axis thereof and adapted to operate said main controller; means driven by said power means for operating said follow up controller; a trim tab power means; a first power transmission means including two relatively displaceable but mutually restrained connected members; a second balanceable control means for said second power means in which the first of said two members is driven by said first power means and the second member is positioned with respect to said first member in accordance with the reactive force on said transmission means from said control surface, whereby said trim tab power means is positioned by said second control means.

10. Control apparatus for an aircraft comprising: a rotatable control surface power means; control means for said power means having an operation initiating element and a rebalancing follow-up element; operating connections from said power means to said follow-up element; attitude sensing means responsive to the movement of the aircraft about an axis and operatively connected to said initiating element; a rotatable control surface actuator coaxial with said power means; a resilient member between said power means and said actuator for transmitting turning effort from said power means to said actuator; an auxiliary control surface power means; and control means for effecting operation of said auxiliary power means and responsive to the deformation of said resilient member, said auxiliary power means operating an auxiliary surface supported by the control surface to reduce said deformation.

11. In combination in an aircraft having an elevator control surface provided with a trim tab, said elevator surface normally tending to assume a streamlined position: a motor for positioning said elevator; connecting means between said motor and said surface comprising two relatively movable members yieldably connected together, one of said members being connected to said motor and the other to said surface; means responsive to a condition for controlling said motor to position said surface; a controller positioned in accordance with the relative movement of said members when said motor tends to maintain said surface in other than said streamlined position; and means controlled by said controller for effecting movement of said trim tab for causing the position which said surface tends to assume to be changed from said streamlined position.

12. Apparatus for positioning a trim tab of a main aircraft control surface, said apparatus comprising: a reversible motor for positioning said trim tab; a speed reducing device between said trim tab motor and said trim tab; main surface power means; motion transmitting means for positioning said main surface from said power means including a member having two elements, one connected to said power means and the other to said surface and resilient means interconnecting said two elements and biasing one element toward the other, whereby said two elements are relatively displaced depending on the force applied to said surface by said power means; and directional control means for said trim tab motor including means connected to said two elements and effective on the relative displacement thereof to cause operation of said trim tab motor to position said tab in a direction to reduce said force applied to said surface, said speed reducing device preventing substantial operation of said trim tab except for prolonged operation of said trim tab motor.

13. In an automatic pilot for an aircraft in flight having primary and secondary control surfaces subject to aerodynamic forces for controlling the attitude of the aircraft about one of its axes of control, said automatic pilot comprising: sensitive means for developing a signal voltage upon deviation of the craft from a desired flight condition; an electrically operated servomotor operable in response to said signal voltage to move the primary control surface to re-establish the desired flight condition; means for developing a displacement signal upon operation of said servomotor opposing said signal voltage; means responsive to both signals operating said servomotor for delivering the required torque to position and maintain in position said primary surface against aerodynamic force thereon; a second electrically operated servomotor positioning said secondary surface to receive an opposite aerodynamic force thereon to reduce said torque requirements; and an electrical circuit means affected by the torque requirements of said first servomotor during the development of a steady state signal by the sensitive means controlling the energization of said second servomotor to cause the latter to operate continuously as long as the torque requirements of said first servomotor are above a predetermined value.

References Cited in the file of this patent

UNITED STATES PATENTS

| | | |
|---|---|---|
| 2,003,930 | Fischel | June 4, 1935 |
| 2,183,932 | Carlson | Dec. 19, 1939 |
| 2,232,982 | Tank | Feb. 25, 1941 |
| 2,325,548 | Roos et al. | July 27, 1943 |
| 2,370,844 | Davis | Mar. 6, 1945 |
| 2,451,263 | Webb | Oct. 12, 1948 |
| 2,511,846 | Halpert | June 20, 1950 |